(12) United States Patent
Lai et al.

(10) Patent No.: US 8,631,356 B2
(45) Date of Patent: Jan. 14, 2014

(54) PRESENTATION OF ADVERTISEMENTS BASED ON USER INTERACTIVITY WITH A WEB PAGE

(75) Inventors: John Lai, Sunnyvale, CA (US); Mandar Shinde, Sunnyvale, CA (US); Calvin Hung, Sunnyvale, CA (US); Sven Haiges, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 340 days.

(21) Appl. No.: 12/841,985

(22) Filed: Jul. 22, 2010

(65) Prior Publication Data

US 2012/0023457 A1   Jan. 26, 2012

(51) Int. Cl.
*G06F 3/033* (2013.01)
*G06F 3/048* (2013.01)
*G06F 3/00* (2006.01)

(52) U.S. Cl.
USPC ............................ 715/863; 715/835; 715/864

(58) Field of Classification Search
USPC .......................................... 715/863, 835, 864
See application file for complete search history.

(56) References Cited

U.S. PATENT DOCUMENTS

| | | | |
|---|---|---|---|
| 7,567,916 B1 * | 7/2009 | Koeppel et al. | 705/7.29 |
| 7,970,647 B2 * | 6/2011 | Koeppel et al. | 705/14.1 |
| 8,229,911 B2 * | 7/2012 | Bennett | 707/706 |
| 2008/0015929 A1 * | 1/2008 | Koeppel et al. | 705/10 |
| 2008/0201311 A1 * | 8/2008 | Ertugrul et al. | 707/4 |
| 2008/0270886 A1 | 10/2008 | Gossweiler et al. | |
| 2009/0222552 A1 * | 9/2009 | Chroscielewski et al. | 709/224 |
| 2010/0066688 A1 | 3/2010 | Jeon | |

FOREIGN PATENT DOCUMENTS

| | | |
|---|---|---|
| KR | 20080077706 | 8/2008 |
| KR | 20100011020 | 2/2010 |

OTHER PUBLICATIONS

International Search Report and Written Opinion issued in International Application No. PCT/US2011/044901, dated Apr. 6, 2012 (7 total pages).

* cited by examiner

*Primary Examiner* — David Phantana Angkool
(74) *Attorney, Agent, or Firm* — Martine Penilla Group, LLP (57) ABSTRACT

Methods and systems for presenting advertisements based on user interactivity with a web page are provided. According to embodiments of the invention, a web page is rendered on a client device. Gesture interactivity with the web page is monitored on the client device. A trigger is executed which defines an interactive event. When the interactive event occurs, as determined based on the monitored gesture interactivity with the web page, secondary content, such as an advertisement, is downloaded and displayed on the client device.

24 Claims, 12 Drawing Sheets

PRESENTATION OF ADVERTISEMENTS BASED ON USER INTERACTIVITY WITH A WEB PAGE

BACKGROUND

1. Field of the Invention

The present invention relates to methods and systems for presenting advertisements based on user interactivity with a web page

2. Description of the Related Art

Numerous advances in technology have fueled the growth of Internet-related technologies. For example, devices such as personal computers, laptops, cellular phones, tablet computers, personal digital assistants (PDA), continue to grow in their widespread adoption and usage for browsing web pages accessible via the Internet. Many of these devices may include interfaces such as a touchscreen interface which may facilitate richer interaction with web pages.

Similarly, the sophistication of web page design continues to advance, with today's web pages including text, graphics, embedded video, and other types of interactive content. Many web page owners derive revenue from their web pages by presenting advertisements to the user when viewing the web page. These advertisements may yield revenue based on the number of times they are shown, the number of times they are clicked on, the number of conversions which result from them, etc.

It is in this context that embodiments of the invention arise.

SUMMARY

Embodiments of the present invention provide methods and systems for presenting advertisements based on user interactivity with a web page. Several inventive embodiments of the present invention are described below.

In one embodiment, a method for presenting content on a client device is provided. According to the method, a graphical display page is rendered on the client device. Gesture interactivity with the graphical display page is monitored. A trigger is executed, the trigger defining an interactive event. The trigger is configured to retrieve secondary content when the interactive event occurs, as determined based on the monitored gesture interactivity with the graphical display page. Thus, retrieving the secondary content is retrieved when the interactive event occurs, as defined by the trigger. And the secondary content is rendered on the client device.

In one embodiment, the monitoring occurs at the client device.

In one embodiment, the execution of the trigger occurs at the client device.

In one embodiment, the secondary content is rendered along with rendering of the graphical display page.

In one embodiment, monitoring interactivity with the graphical display page includes detecting gestures on a touchscreen of the client device. Furthermore, gestures may include one or more of touching a finger on the touchscreen, sliding a finger on the touchscreen, sliding two or more fingers on the touchscreen, tapping a finger on the touchscreen, moving a finger over a defined pattern or path on the touchscreen, or tracing a symbol on the touchscreen.

In one embodiment, the trigger is defined by one or more of a number of scrolls of the graphical display page, navigation to a specific location within the graphical display page, a timer, a duration of activity, a duration of inactivity.

In various embodiments, the secondary content is selected from the group consisting of advertisements, property drivers, and a search tool. Furthermore, the property drivers may include one or more of a link to a related graphical display page, a link to add an application to the client device, a link to a survey.

In another embodiment, a method for presenting content on a client device is provided. According to the method, a graphical display page is sent to the client device, the graphical display page being rendered on the client device. Also, a trigger is sent to the client device, the trigger defining an interactive event. The trigger, when executed by the client device, is operable for requesting secondary content when the interactive event occurs, as determined based on monitored gesture interactivity with the graphical display page. A request for secondary content is received from the client device when the interactive event occurs, as defined by the trigger. Then, in response to the request for secondary content, the secondary content is sent to the client device, the secondary content being rendered on the client device.

In another embodiment, a system for presenting content on a client device is provided. The system includes a page server, a content server, and a client device. The client device is configured to retrieve a graphical display page from the page server and render the graphical display page. Moreover, the client device is configured to retrieve a trigger from the content server, the trigger defining an interactive event. The trigger, when executed, is operable for retrieving secondary content from the content server when the interactive event occurs, as determined based on monitored gesture interactivity with the graphical display page. And the client device is configured to render the secondary content.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for presenting advertisements based on user interactivity with a web page. According to embodiments of the invention, a web page is rendered on a client device. Gesture interactivity with the web page is monitored as a user interacts with the web page. A trigger is executed which defines an interactive event. The trigger determines when the interactive event occurs based on the monitored gesture interactivity with the web page. When the interactive event occurs, the trigger causes secondary content, such as an advertisement, to be downloaded and displayed on the client device.

It will be obvious, however, to one skilled in the art, that the present invention may be practiced without some or all of these specific details. In other instances, well known process operations have not been described in detail in order not to unnecessarily obscure the present invention.

Figure 1:
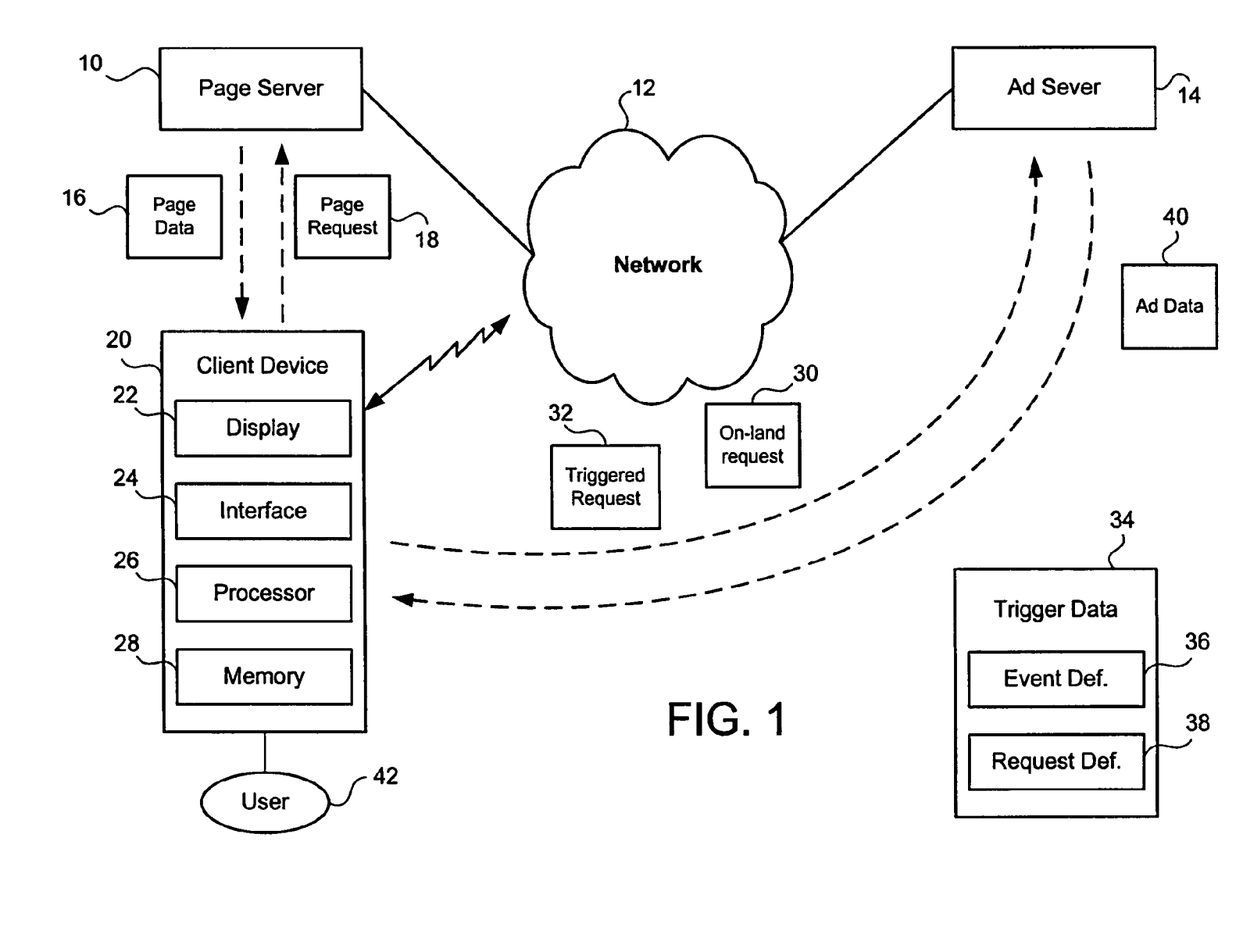
FIG. 1 illustrates a system for presenting advertisements on a client device based on user interactivity, in accordance with an embodiment of the invention.

With reference to FIG. 1, a system for presenting advertisements on a client device based on user interactivity is shown, in accordance with an embodiment of the invention. The system includes a page server 10, an ad server 14, and a client device 20. The client device 20 connects to both the page server 10 and the ad server 14 via a network 12. The network 12 may include any of various kinds of networks, such as a cellular network, a wifi network, a cable network, a digital subscriber line (DSL) network, a local area network (LAN), a wide area network (WAN), the Internet, or any other kind of network which may be utilized to facilitate communication and transmission of data between the client device 20 and the page server 10 and ad server 14.

A user 42 operates the client device 20. The client device 20 includes a display 22 for graphically presenting content to the user 42. The client device 20 also includes an interface 24 for enabling the user 42 to provide input to the client device 20. In various embodiments, the interface 24 may include any of various kinds of input mechanisms, such as a touchscreen interface, keyboard, trackball, trackpad, joystick, motion sensors, and various other types of input mechanisms by which the user 42 may provide input to the client device 20. The client device includes a processor 26 and a memory 28, for storing data, executing programs, performing various operations, and the like.

As shown in the illustrated embodiment, the user 42 operates the client device 20, utilizing the interface 24 to navigate to a certain graphical display page. In various embodiments, the graphical display page may be a web page, a page of an application, a page of an operating system, or some other type of page which contains content which the user 42 may access via the client device 20. In one embodiment, the user 42 utilizes a web browser running on the client device 20 to access the graphical display page. In order to access the graphical display page, the client device generates a page request 18, which is sent to the page server 10 via the network 12. The page server 18 receives the page request 18, and responds by generating and sending page data 16 back to the client device 20. The client device 20 receives the page data 16, and renders it as the graphical display page on the display 22.

The page data 16 may include one or more references to retrieve trigger data from the ad server 14. Thus, upon landing on the graphical display page, the client device reads the reference and generates an on-land request 30 which is communicated to the ad server 14. Based on the on-land request 30, the ad server 14 generates and sends trigger data 34 to the client device 20. In one embodiment, the trigger data 34 includes script data which is executed by the client device 20 to activate a trigger, examples and details of which are explained in further detail below. In another embodiment, the trigger data 34 does not include directly executable data, but includes data which is utilized by an existing executing program to activate the trigger. The trigger data 34 includes an event definition 36 and a request definition 38. The event definition 36 defines an event for which the trigger will cause a request to be generated based on the request definition 38, when the event occurs.

The user 42 views the graphical display page displayed on the display 22 of the client device 20. As the user 42 views the graphical display page, the user 42 may interact with the graphical display page by, for example, providing gesture input on a touchscreen interface of the client device 20. Various examples of gestures may include touching a finger on the touchscreen, sliding a finger on the touchscreen, sliding two or more fingers on the touchscreen, tapping a finger on the touchscreen, moving a finger over a defined pattern or path on the touchscreen, tracing a symbol on the touchscreen, etc. Such gestures may be applied by the client device to effect various kinds of interactions with the graphical display page, such as moving/panning the graphical display page on the display 22 so as to enable the user to view different portions of the graphical display page, zooming in or out, scrolling the page, entering text, drawing a symbol, etc. Additionally, interactivity with the graphical display page may include various other kinds of interactive input, such as input derived from a keyboard, joystick, trackball, motion sensors, or any other type of input mechanism which may facilitate interactivity with the graphical display page.

The interactivity with the graphical display page is monitored. When the event defined by the event definition 36 occurs, the trigger generates a triggered request 32 according to the request definition 38 which is communicated to the ad server 14. In response to the triggered request 32, the ad server 14 sends ad data 40 to the client device 20. The ad data 40 is rendered by the client device 20 as an advertisement displayed on the display 22 of the client device 20. In various embodiments, the triggered request 32 may take various forms and have varying degrees of sophistication. For example, in one embodiment, the triggered request 32 simply requests the next available advertisement. Whereas in other embodiments, the triggered request 32 may request a specific kind of advertisement, or may include various types of data which may be utilized by the ad server 14 to determine which advertisement the ad server 14 serves. In various embodiments, the determination of the order in which advertisements are served by the ad server 14 to the client device 20 can be determined based on several types of criteria. For example, the specific advertisements served and their ordering may be based on time of day, previous browsing history, predefined user preferences, the content of the current graphical display page, etc. Additional examples of the triggered request 32 are provided in greater detail further below.

In various embodiments of the invention, the trigger may define any of various kinds of interactive events, which when detected, cause fetching and rendering of an ad. Examples of such interactive events include: a number of scrolls of the graphical display page, viewing of a particular location on the graphical display page, an predefined period of time during which no interactivity is detected, zooming in or out of a section of the graphical display page, etc. In other embodiments, the trigger may respond to any type of detected interactivity with the graphical display page so as to cause an ad to be retrieved and rendered. In some embodiments, the attributes of the interactive event defined by the trigger may vary based on properties of the graphical display page. In one embodiment, the interactive event defined by the trigger could be made variable based on the density/amount of information on the graphical display page. For example, where the trigger includes a timer which detects how much time has elapsed without any detected interactivity, the duration of the timer before the trigger causes an ad to be rendered might be proportional to the density/amount of information on the graphical display page. Thus, when the duration of the timer for a page having a higher density/amount of information will be longer than a page having a lower density/amount of information. Similarly, a trigger which defines a number of scrolls may set the number of scrolls before it causes an ad to be shown based on the density/amount of information on the page. For example, for a page with a high density of information, an ad might be triggered when a low number of scrolls is detected, whereas for a page with a low density of information, the ad might be triggered when a higher number of scrolls is detected. The density or amount of information on a graphical display page may be determined according to various methods and based on various factors, such as the amount of text on the page, the area of the page, the amount of pictures or videos on the page, the number of sections of content on the page. In addition to density or amount of information on a page, other factors may be utilized to affect the interactive event defined by a trigger, such as the popularity of the page, the type of content presented on the page (e.g. text, images, video, audio, etc.), the subject of the content on the page, etc.

Figure 2:
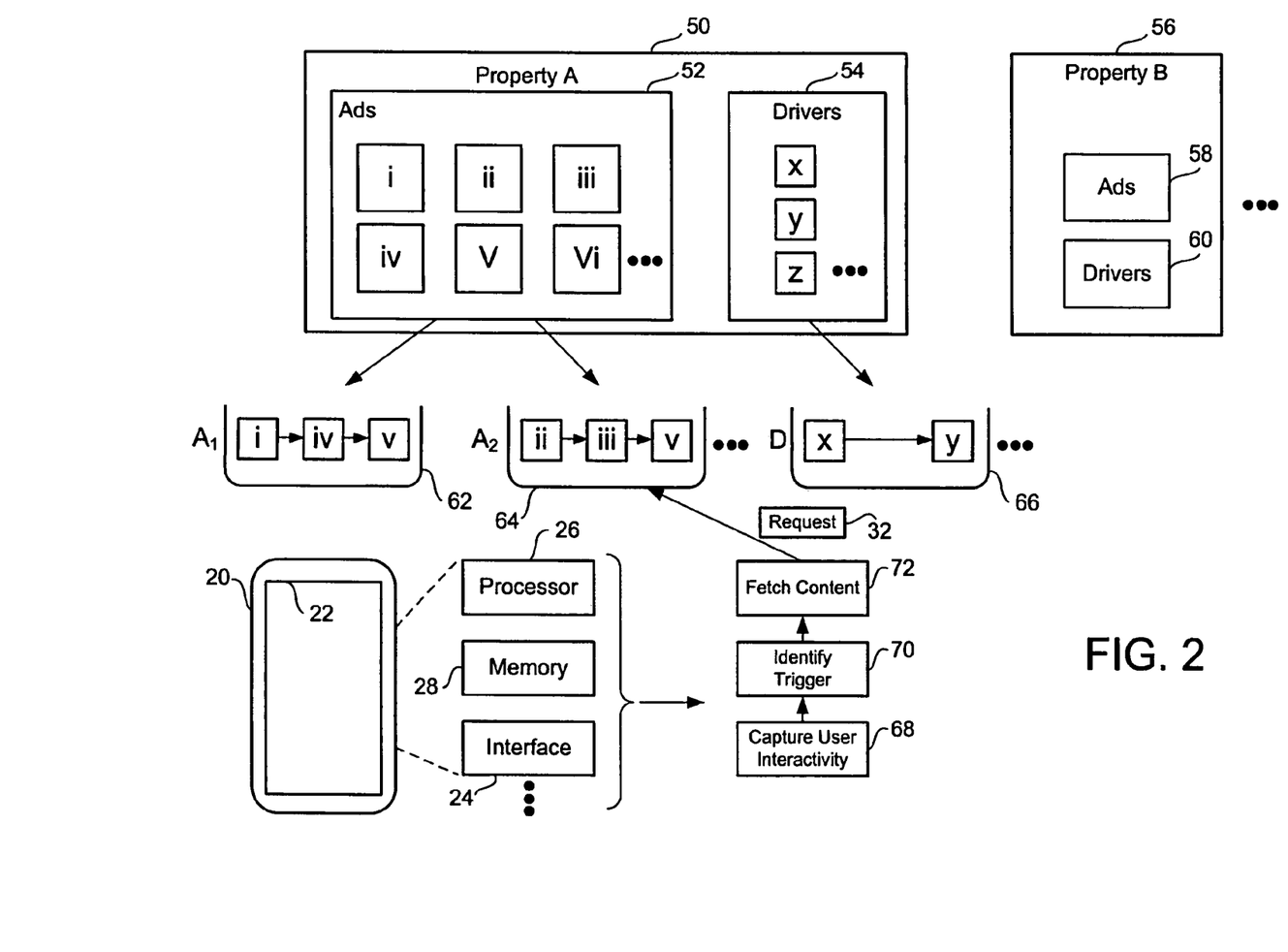
FIG. 2 illustrates a logical diagram illustrating the distribution of content to a client device 20 is shown, in accordance with an embodiment of the invention.

With reference to FIG. 2, a logical diagram illustrating the distribution of content to a client device 20 is shown, in accordance with an embodiment of the invention. As shown, the client device includes a display 22, a processor 26, a memory 28, and an interface 24, as previously described above. The client device 20 renders content for a given property A, denoted by reference numeral 50. The property A denotes a portion of content which is organized or designated for a specific purpose or is part of a common group. Similarly, there may be other properties such as property B 56, etc. By way of example only, in one embodiment, the properties could be different sections of an Internet portal. An example of an Internet portal is the Yahoo! web portal, which includes various sections, such as news, sports, weather, finance, etc. Each of these sections might constitute a specific property, or a particular page within one of the sections might constitute a specific property. In other embodiments, the properties may be portions of content related to other types of entities, such as specific applications. In one embodiment, the specific applications are applications for a portable device, such as a cellular phone, laptop computer or tablet computer.

The property A 50 includes advertisements 52, and drivers 54. Similarly, property B 56 includes ads 58 and drivers 60. While advertisements are generally revenue-generating in nature, drivers are generally not revenue-generating in and of themselves, but are intended to drive users to a particular property or content or to take some type of action. Examples of drivers include messages which include links to other pages, messages suggesting the user add a particular application, update software, set preferences, messages which highlight new features or new properties, etc.

With continued reference to FIG. 2, a number of buckets are shown, including bucket $A_1$ 62 and bucket $A_2$ 64, and bucket D 66. For purposes of the present invention, a bucket will be understood as a logical grouping of content which has been selected from a larger pool of content, such as the advertisements or drivers of a given property. Buckets $A_1$ 62 and $A_2$ 64 each contain an ordered sequence of advertisements selected from the advertisements 52 of property A. Similarly, the bucket D 66 includes an ordered sequence of drivers selected from the drivers 54. In various embodiments, the particular ordered sequence of content in a given bucket may be determined according to any of various selection and ordering methods, taking into account various factors for determination. For example, the particular advertisements and their sequence in a bucket may be determined based on their content, relevance, keywords, topic, the time of day, etc. As shown in the illustrated embodiment, bucket $A_1$ 62 includes ads i, iv, and v. When ads are fetched from bucket $A_1$ 62, ad i will be the first one served, followed by ad iv, and v. Similarly, bucket $A_2$ 64 includes ads ii, iii, and v. Thus, when ads are fetched from bucket $A_2$ 64, ad ii will be first served, followed by ads iii, and v. And as shown, bucket D 66 includes drivers x and y. When drivers are fetched from bucket D 66, driver x will be served first, followed by driver y.

As the user views the graphical display page shown on the display 22 of the client device 20 (including its processor 26, memory 28, and interface 24) performs certain operations. At operation 68, the user's interactivity with the graphical display page is captured. The captured interactivity with the graphical display page may include captured gesture interactivity, as described above. At operation 70, a trigger is identified, the trigger causing the client device 20 to fetch content (operation 72) when an event defined by the trigger occurs. The client device 20 fetches the content by generating a request 32 as determined according to the trigger. In the illustrated embodiment, the request 32 is configured to request an advertisement from the $A_2$ bucket 64.

Figure 3A:
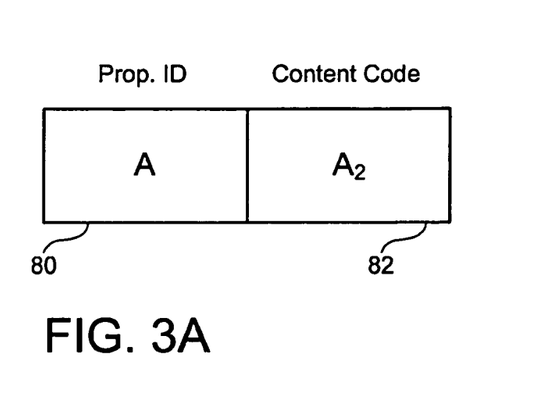
FIGS. 3A, 3B, and 3C illustrate various examples of request formats, in accordance with embodiments of the invention.
Figure 3B:
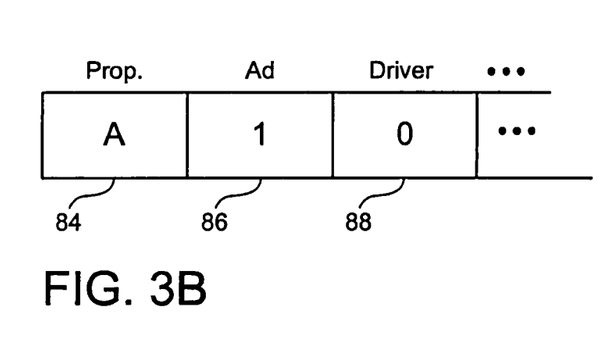
Figure 3C:
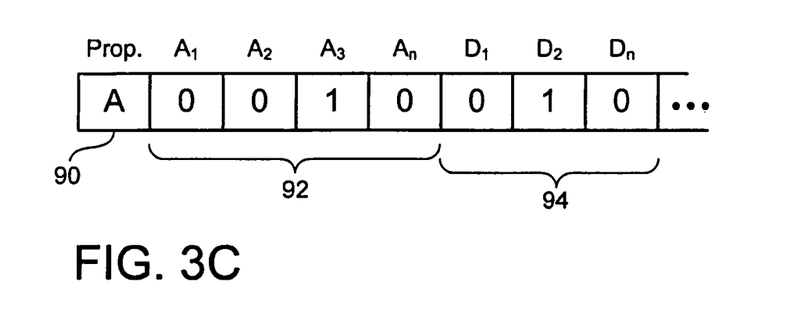

With reference to FIGS. 3A, 3B, and 3C, various examples of request formats including various fields are shown, in accordance with embodiments of the invention. As shown at FIG. 3A, one example of a request format includes a property identification field 80 and a content code 82. The property identification field 80 specifies a property to which the request pertains. And the content code 82 specifies the type of content which is being requested. By way of example only, the content code 82 as shown is A2, which may indicate a request for content from the A2 bucket 64 as described above. In other embodiments, the content code 82 may specify a particular piece of content, a bucket, a type of content, or some other information which is utilized to determine what content will be served in response to the request.

At FIG. 3B, a request may include a property identification field 84, an advertisement indicator field 86, and a driver indicator field 88, among various other possible types of indicator fields. The advertisement indicator field 86 denotes whether or not an advertisement is being requested. By way of example, a value of 1 may indicate that an advertisement is being requested, whereas a value of 0 may indicate that no advertisement is being requested. Similarly, the driver indicator field 88 denotes whether or not a driver is being requested, with a field value of 1 or 0 corresponding to a positive request or a non-request, respectively.

With reference to FIG. 3C, a request format may include a property identification field 90, as well as a number of advertisement indicator fields 92 ($A_1$, $A_2$, $A_3$, . . . $A_n$), and driver indicator fields 94 ($D_1$, $D_2$, . . . $D_n$). Each of the advertisement indicator fields 92 may each denote a specific advertisement, a type of advertisement, a bucket of advertisements, a specific one of an ordered group of advertisements, etc. A field value of 1 indicates a positive request, whereas a field value of 0 indicates no request. As shown, the $A_3$ advertisement indicator field has a value of 1, indicating that an advertisement corresponding to the $A_3$ advertisement indicator field is being requested. Likewise, the driver indicator fields 94 may denote each denote a specific driver, a type of driver, a bucket of drivers, a specific one of an ordered group of drivers, etc. As shown, the $D_2$ driver indicator field has a value of 1, indicating that a driver corresponding to the $D_2$ driver indicator field is being requested.

The foregoing examples of request formats including various field types are provided by way of example only. In other embodiments, the request may have any format which enables the client device 20 to request content, as determined from a trigger based on monitored interactivity with the graphical display page.

Figure 4:
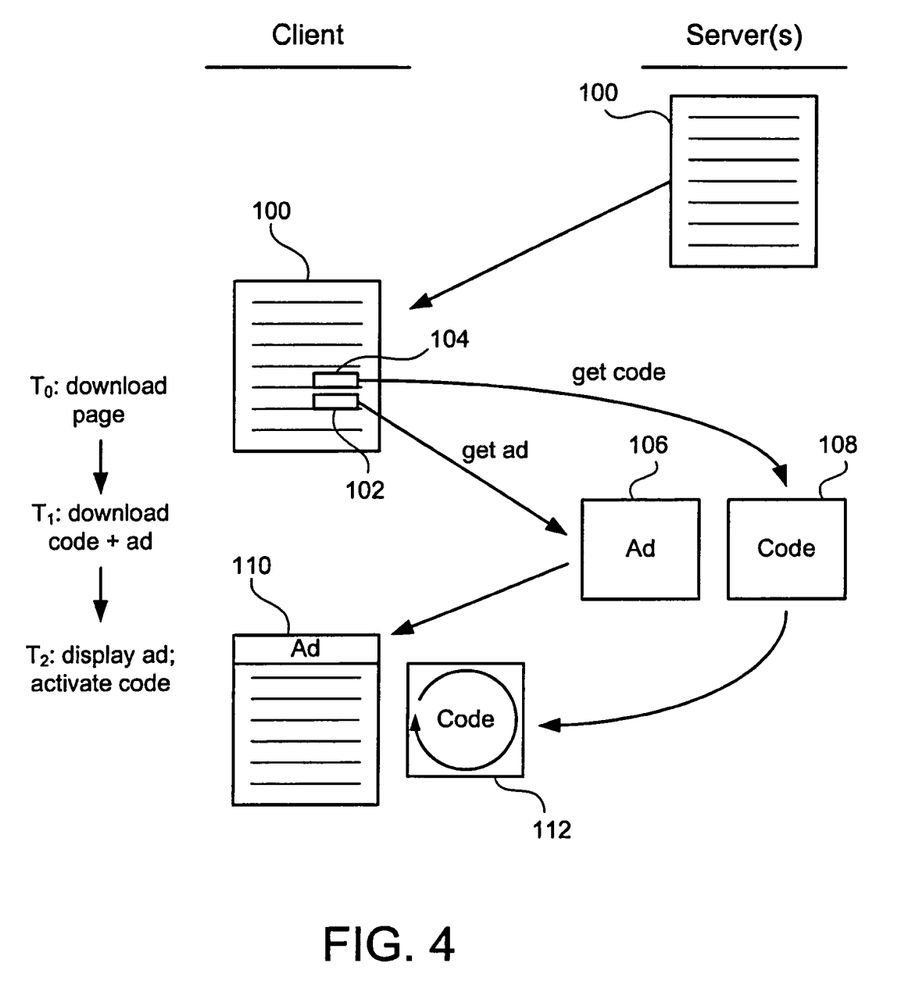
FIG. 4 illustrates a method for retrieving and activating code following download of a graphical display page, in accordance with an embodiment of the invention.

With reference to FIG. 4, a method for retrieving and activating code following download of a graphical display page is shown, in accordance with an embodiment of the invention. As shown, at time $t_0$, a graphical display page 100 is downloaded to a client device. The graphical display page includes a reference 102 to retrieve an ad 106, and a reference 104 to retrieve additional code 108. Thus, at time $t_1$, simultaneous with execution and rendering of the graphical display page, the ad 106 and code 108 are downloaded to the client device. Then at time $t_2$, the ad is rendered as banner ad 110 on the graphical display page, and the downloaded code is activated as active code 112. In embodiments of the invention, the active code 112 may include one or more triggers which, based on monitored interactivity with the graphical display page on the client device, will trigger retrieval of additional content such as advertisements or property drivers in response to certain predefined events.

Figure 5A:
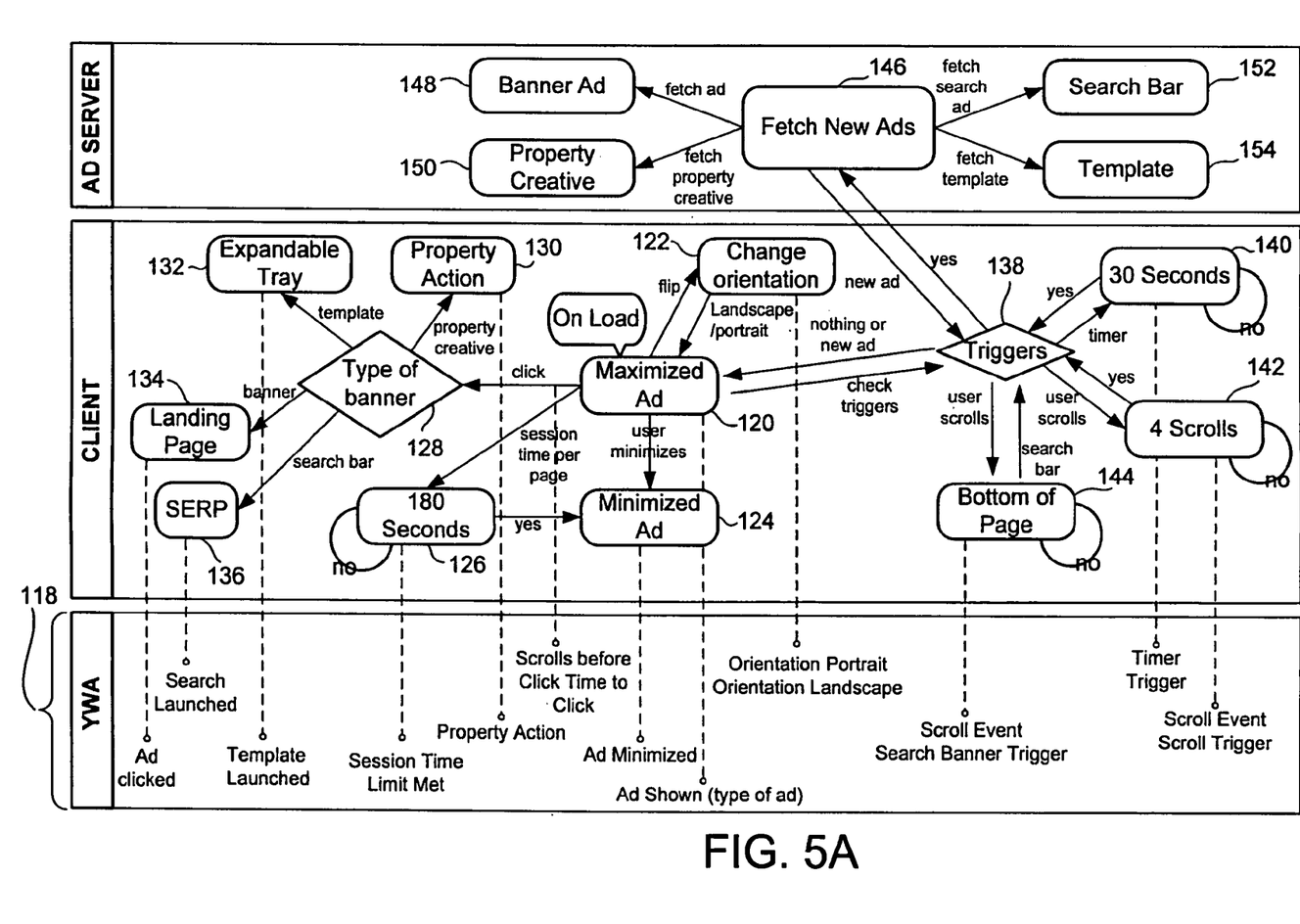
FIG. 5A illustrates a state diagram illustrating various states of a system including a client device and an ad server, in accordance with an embodiment of the invention.

With reference to FIG. 5A, a state diagram illustrating various states of a system including a client device and an ad server is shown, in accordance with an embodiment of the invention. Various processes are herein described with reference to the various states. For purposes of the present disclosure, the various states will be described in a particular order. However, it will be understood by those skilled in the art that in various embodiments, any of the described states may represent a beginning, intermediate or ending state for a given process. Furthermore, some processes may or may not require some of the states in order to achieve an ending state.

The lower portion of the diagram indicates events which are recorded for purposes of capturing metrics which may be analyzed. Upon loading a graphical display page on the client device, a maximized ad is shown (indicated by reference numeral (hereinafter, ref.) 120). If the user changes the orientation of the device (ref. 122), such as by rotating or flipping the device, then the orientation of the maximized ad is also changed (from landscape to portrait, or vice versa) depending on the particular orientation of the device. The user may also choose to minimize the ad (ref. 124), which is explained in greater detail further below.

Upon maximizing the ad, a session timer also determines whether or not 180 seconds have elapsed (ref. 126). If 180 seconds have elapsed, then the ad is minimized (ref. 124). If the user clicks on the maximized ad, then a type of banner is determined (ref. 128) for display in response to the user click. In one embodiment, a property creative is rendered, resulting in some type of property action (ref. 130). In another embodiment, a template is launched, such as an expandable tray (ref. 132). The expandable tray may be rendered with any of various kinds of content. In another embodiment, a banner is rendered, such as a landing page (ref. 134). In another embodiment, a search bar is rendered, and a search engine process is initiated when the user initiates a search (ref. 136).

Simultaneous with the display of the maximized ad upon loading of the graphical display page, a number of triggers are activated (ref. 138). Each of the triggers determines whether or not a specific event has occurred, the event based on the user's interactivity with the graphical display page. One example of a trigger is a 30 second timer which determines when 30 seconds have elapsed without any new detected interaction with the graphical display page (ref. 140). When 30 seconds elapse without any new activity, the trigger activates a call to fetch new ads (ref. 146). Similarly, another trigger causes the client device to fetch new ads when the trigger detects that the user has scrolled the graphical web page four times (ref. 142). In another trigger, a new ad is fetched when the user scrolls to the bottom of the graphical display page—specifically, a search bar or search ad. In some embodiments, the ad can be an interactibe interface, provide application functionality, or report interfacing metrics back to the server or servers.

New ads are fetched from the ad server when the event defined by a given trigger occurs (ref. 146). The type of ad fetched may vary according to the trigger or according to other mechanisms. For example, banner ad might be fetched (ref. 148), such as revenue-generating advertisements. Or a property creative might be fetched (ref. 150), such as a survey, a property driver, or other types of creatives which are related to the property of which the graphical display page is a part. A search ad including a search bar could be fetched (ref. 152), for example, when the user reaches the bottom of the graphical display page. Scrolling to the bottom of the page could indicate that the user did not find what he or she was looking for on the graphical display page, or at the least, the user has reached the end of the page, and therefore may be seeking additional information. Hence, presentation of a search ad when the user scrolls to the bottom of the page may be especially useful to the user. In another example of a new ad fetching operation, a template may be fetched (ref. 154). The template may be filled with other ads, creatives, etc.

Figure 5B:
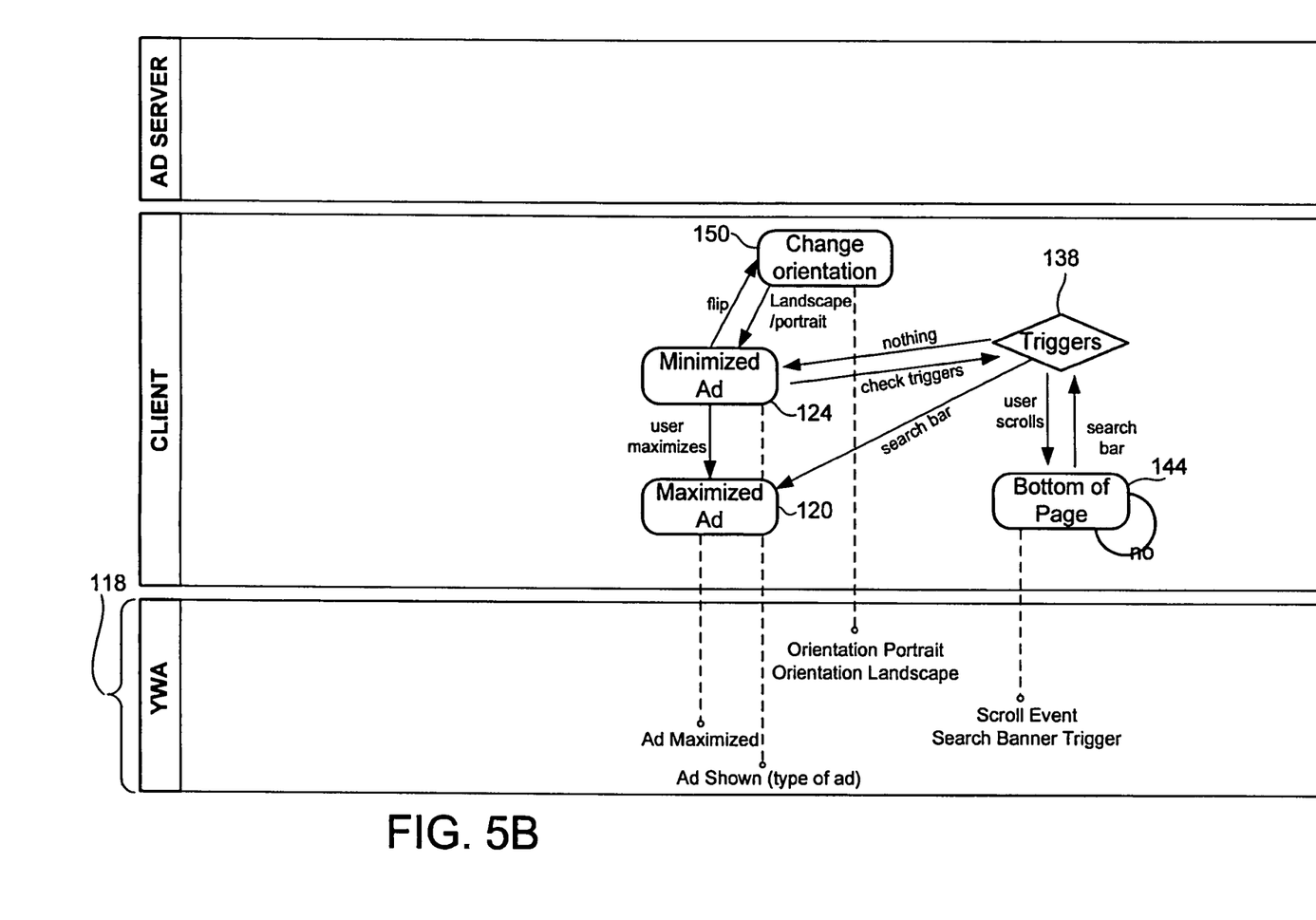
FIG. 5B illustrates a state diagram showing various states following minimization of an ad, in accordance with an embodiment of the invention.

With reference to FIG. 5B, a state diagram showing various states following minimization of the aforementioned ad (ref. 124). For example, when the user changes the orientation of the client device, then the orientation of the minimized ad is also changed so as to present the minimized ad in the proper orientation to the user (ref. 150). The user may also maximize the ad (ref. 152). When the user minimizes the ad, then the user may be indicating that they are not interested in viewing ads. Therefore, no new ads are served in response to triggers (ref. 138) unless the user reaches the bottom of the page (ref. 144). When the user scrolls to the bottom of the page (ref. 144), then a search bar is shown as the maximized ad (ref. 120).

Figure 6:
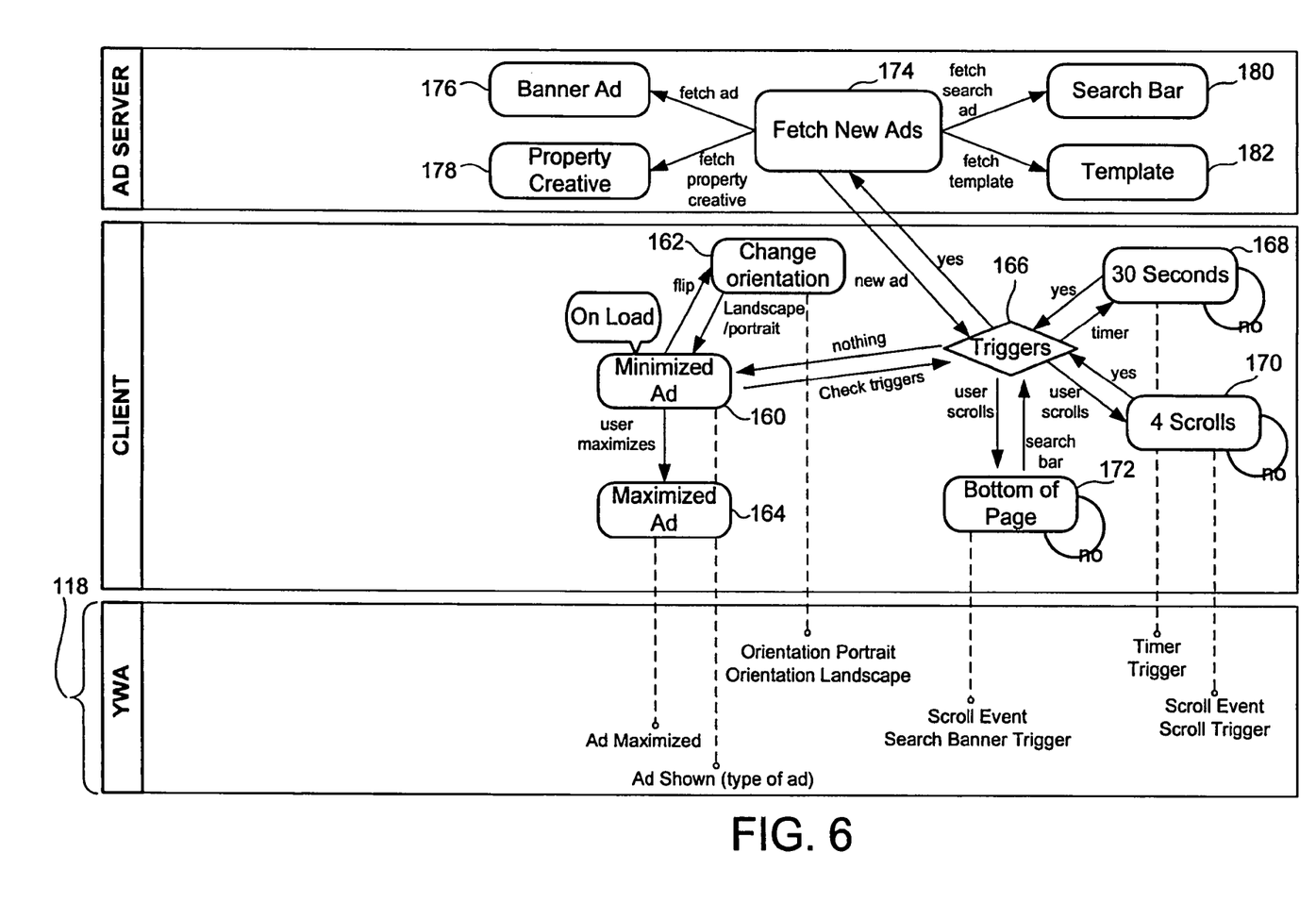
FIG. 6 illustrates a state diagram illustrating various states of a system including a client device and an ad server is shown, in accordance with an embodiment of the invention.

With reference to FIG. 6, a state diagram illustrating various states of a system including a client device and an ad server is shown, in accordance with an embodiment of the invention. Upon loading of a graphical display page on the client device, a minimized ad is shown (ref. 160). If the user changes the orientation of the client device, then the orientation of the minimized ad is also changed accordingly (ref.

162). The user may also maximize the ad for viewing (ref. 164). When the ad is maximized, then a process similar to that described above with reference to FIG. 5A is implemented, wherein a type of banner is determined and rendered in response to the user clicking on the maximized ad.

From the minimized ad state (ref. 160), a number of triggers are checked (ref. 166). Various examples of triggers are provided, including a timer which determines when 30 seconds have elapsed without any activity, a trigger which determines when the user has scrolled the graphical display page four times (ref. 170), and a trigger which determines when the user has scrolled to the bottom of the graphical display page (ref. 172). When an event defined by a trigger occurs, the trigger initiates a call to fetch new ads (ref. 174). Examples of new ads include banner ads (ref. 176), property creatives (ref. 178), search bars (ref. 180), and templates which may be filled with other content (ref. 182). The trigger fetches the new ad, which is displayed to the user as a maximized ad (ref. 164).

Figure 7:
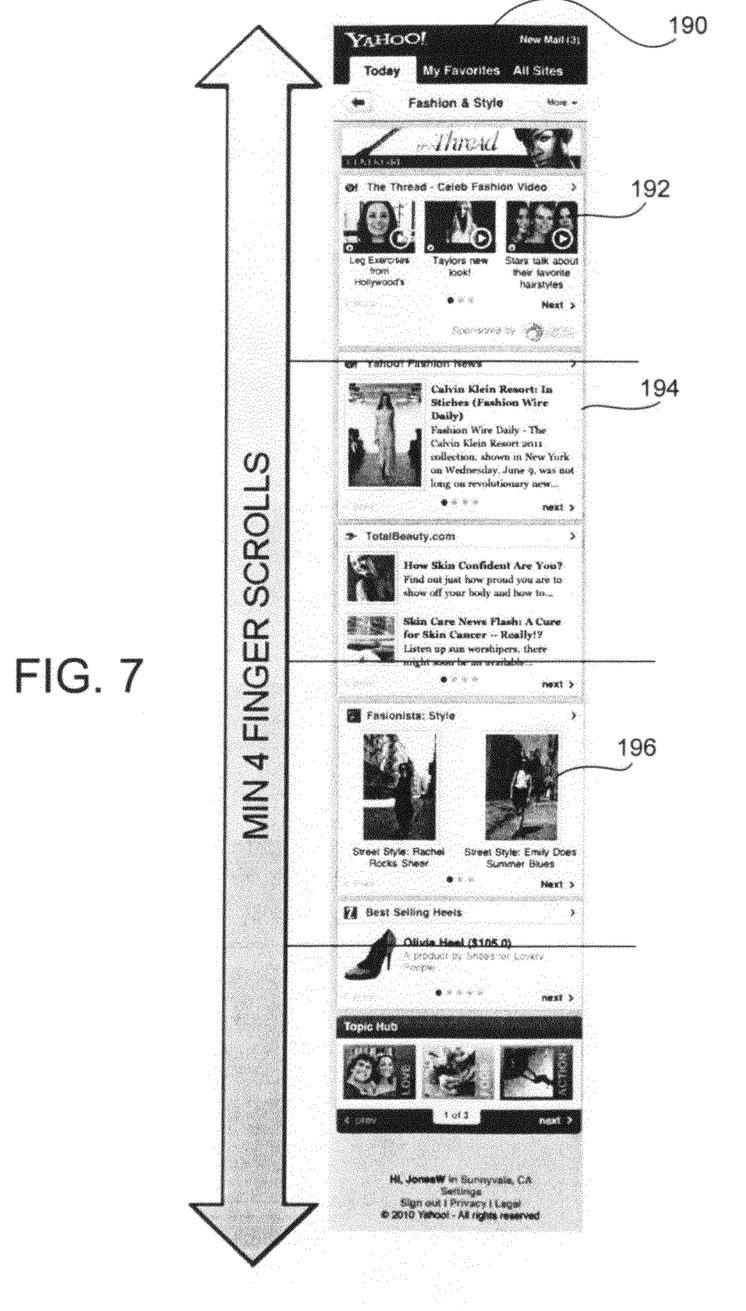
FIG. 7 illustrates a graphical display page, in accordance with an embodiment of the invention.

With reference to FIG. 7, a graphical display page 190 is shown, in accordance with an embodiment of the invention. The graphical display page 190 in the illustrated embodiment is a web page designed for rendering on a portable client device. Because the client device may have a compact screen, only a portion of the page 190 may be viewed at any one time on the client device, and the page is designed so as to be scrolled in a vertical direction. Typically, a user will scroll the page 190 by providing gesture input on a touchscreen of the client device, such as by moving their finger in a vertical fashion across the touchscreen. A typical graphical display page may require a minimum of four finger scrolls in order to traverse the entire page. The graphical display page 190 may include various forms of content, such as embedded videos 192, articles 194, pictures 196, and other types of content. As the user views the page 190 and interacts with the page, such as by scrolling the page, any of various triggers are operative to cause ads or other types of supplemental content to be displayed with the page. The supplemental content is fetched and shown based on detected interactivity with the page itself.

Figure 8:
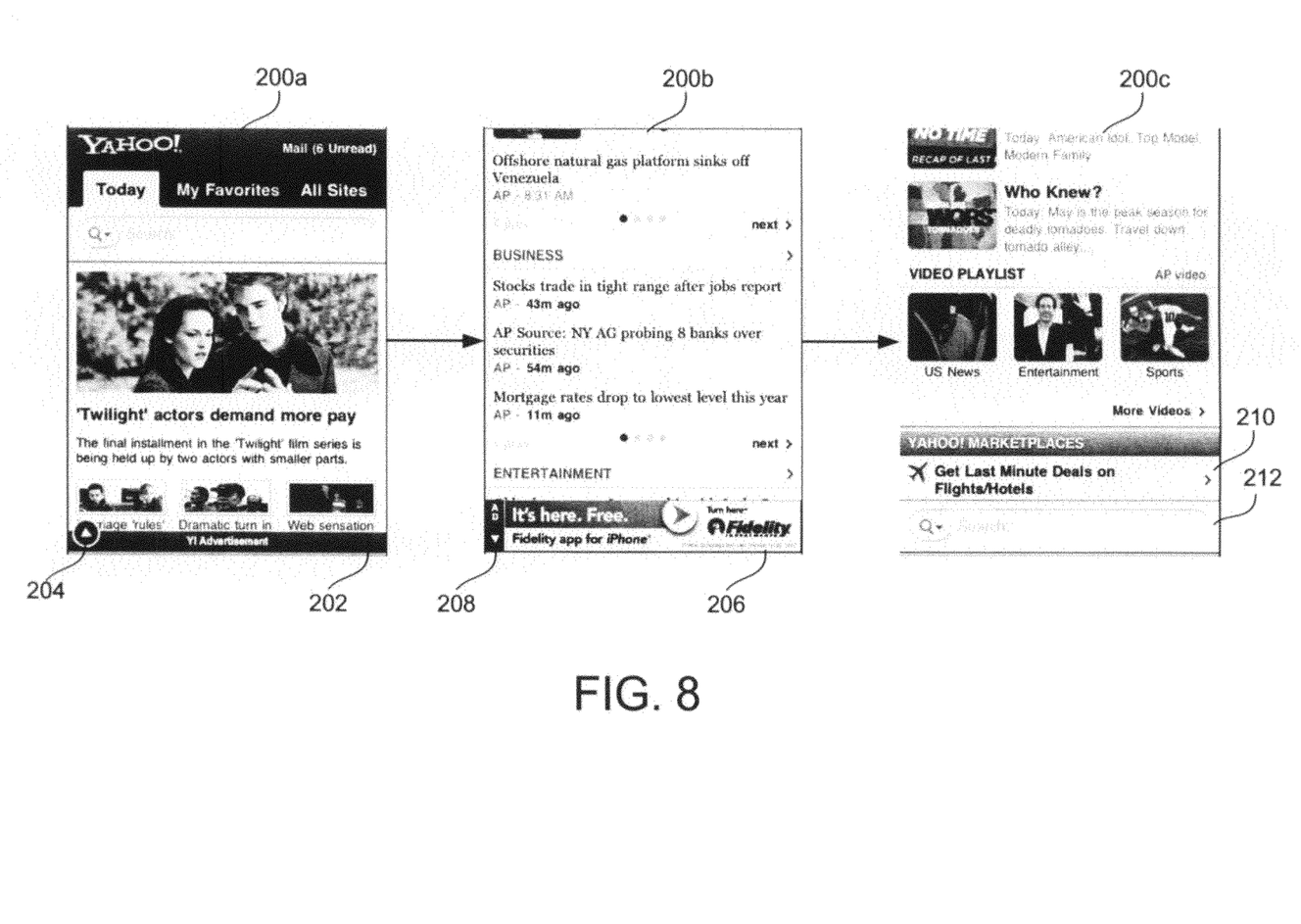
FIG. 8 illustrates a sequence showing different portions of a graphical display page, in accordance with an embodiment of the invention.

With reference to FIG. 8, a sequence showing different portions of a graphical display page is shown, in accordance with an embodiment of the invention. A portion 200a of the graphical display page is shown on loading of the graphical display page at a client device. As shown, the portion 200a displays various content. At the bottom of the display a minimized advertisement 202 is shown. By touching a button 204, the user can maximize the advertisement 202 for viewing. As the user scrolls the graphical display page to another portion 200b, an ad 206 is shown overlaid on the graphical display page at the bottom of the client device display. The ad 206 occupies a static position on the client device display, such that it is viewable in the same position even as the user scrolls the graphical display page. In one embodiment, a trigger mechanism which detects a certain number of scrolls (one or more) of the page, fetches and displays the ad 206 when the given number of scrolls of the page has occurred. The user may also minimize the ad 206 by touching a minimize button 208.

By displaying an ad after a certain number of scrolls, the user is not shown a new ad until the user interacts with the page to a certain extent. This can enable the ad to be more effectively shown, as the user may be more receptive to ads after having viewed or interacted with the content of the graphical display page. And by presenting the ad based on detected interactivity with the page, attention is drawn to the ad at the right time. This contrasts with prior art systems in which an ad is simply shown alongside content at the time the content is loaded. A user may initially choose to ignore such ads in favor of viewing content which is of immediate interest, and never return their attention to the ad. However, when ads are fetched and shown based on interactivity with the page, the timing and type of the ad shown can be tailored based on the user's interactivity with the page so as to maximize the effectiveness of the ad.

As the user scrolls to the bottom of the graphical display page, as shown by portion 200c, a property driver 210 and a search bar 212 are rendered at the bottom of the client device display. When scrolling to the bottom of a graphical display page, the user may be more receptive to suggested properties to which the user may navigate. Hence presentation of such property drivers at that time may enable the property drivers to be more effectively displayed. Also, a search tool may be helpful to a user after the user has scrolled to the end of the content of the graphical display page, as the user may be seeking additional information following viewing of the page.

Figure 9A:
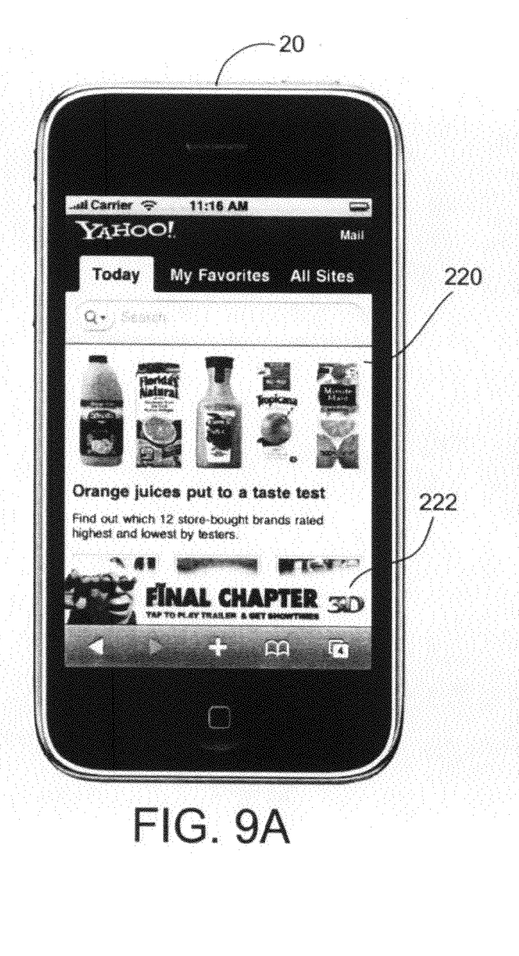
FIGS. 9A and 9B illustrate an ad in minimized and maximized states, in accordance with an embodiment of the invention.
Figure 9B:
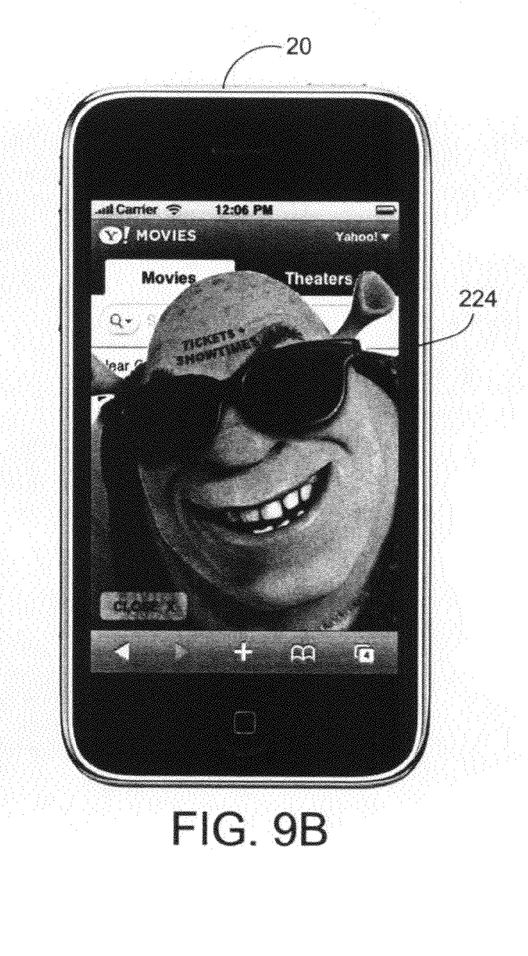

With reference to FIGS. 9A and 9B, an ad is shown in minimized and maximized states, in accordance with an embodiment of the invention. As shown at FIG. 9A, a graphical display page 220 is shown on a client device 20. Simultaneously, a minimized ad 222 is shown towards the bottom of the client device display, overlaid on the graphical display page 220. At FIG. 9B, the maximized ad 224 is shown on the client device 20. The ad may be maximized through a variety of mechanisms. For example, the ad could be maximized when the user touches or taps the minimized ad 222. Additionally, the ad could be maximized based on a number of triggers which cause maximization of the ad in response to a certain detected interactivity with the graphical display page 220. For example, the ad might be maximized after a preset time has elapsed. Or the ad could be maximized when the user scrolls the graphical display page a certain number of times.

Figure 10A:
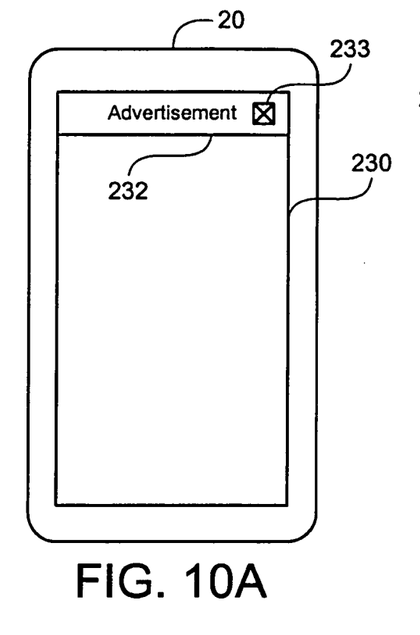
FIGS. 10A and 10B illustrate examples of advertisements which may be shown based on interactivity with a graphical display page, in accordance with embodiments of the invention.
Figure 10B:
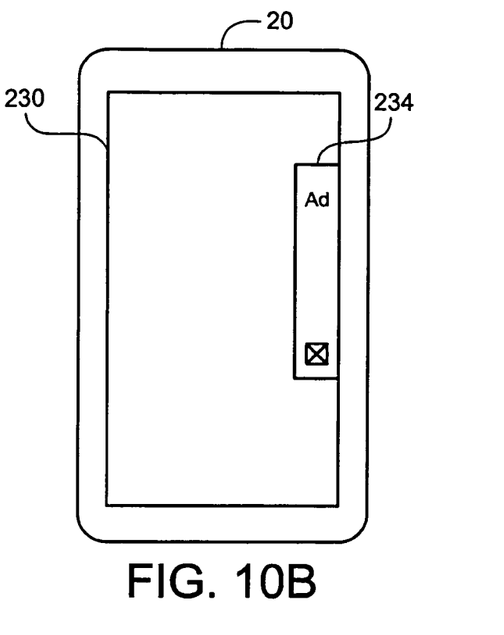

With reference to FIGS. 10A and 10B, examples of advertisements which may be shown based on interactivity with a graphical display page are shown, in accordance with embodiments of the invention. As shown at FIG. 10A, a graphical display page 230 is displayed on a display of a client device 20. Simultaneously, an ad 232 is shown in an upper region of the display of the client device 20. The ad 232 may have a static position, such that the ad 232 remains visible in the same location of the display of the client device 20 even as the user scrolls the page 230. The ad 232 may be minimized or closed completely when the user touches a button 233. Similarly, in another example shown at FIG. 10B, an ad 234 is displayed in a side region of the display of the client device 20.

Figure 11A:
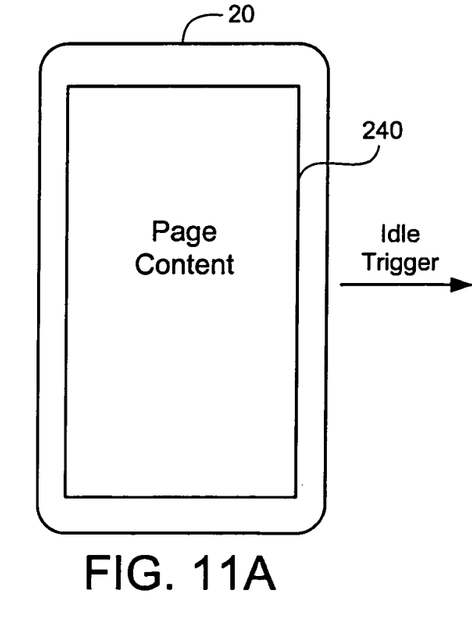
FIGS. 11A and 11B illustrate the operation of a full-page advertisement, in accordance with an embodiment of the invention.
Figure 11B:
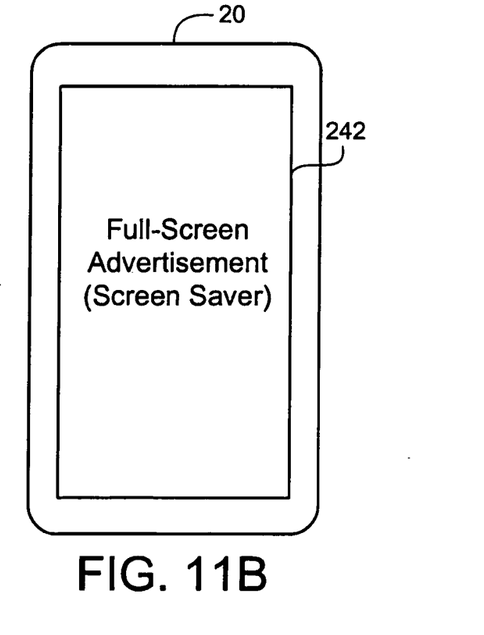

With reference to FIGS. 11A and 11B, the operation of a full-page advertisement is shown, in accordance with an embodiment of the invention. At FIG. 11A, a graphical display page 240 is displayed on a client device 20. As described in accordance with embodiments above, a trigger mechanism operates on the client device 20. In the illustrated embodiment, the trigger is an idle timer which detects when the user has been idle for a period of time—in other words, when no interactivity with the graphical display page 240 is detected. If the period of time is great enough (e.g. two minutes), this may indicate that the user has stepped away or is otherwise not engaged in viewing the graphical display page 240. Thus, as illustrated at FIG. 11B, the trigger may be configured to cause a full-screen advertisement 242 or some other creative to be downloaded and shown on the client device 20. Such a full-screen ad would normally be disruptive to the user's viewing of the graphical display page, but if based on detected user interactivity, it is determined that there is a high probability that the user is no longer actually viewing the page, then it may be appropriate to display a full-screen ad. In various embodiments, the length of time which must elapse without interactivity before a full-screen ad is shown may vary, including 30 seconds, one minute, two minutes, or any other length of time. In other embodiments, the length of time may vary depending upon the nature of the content of the graphical display page. For example, a page with a high amount or density of text may have a trigger configured with a longer timer than a page with a low amount or density of text, as the user may take longer to read the page with the higher amount or density of text without providing any detectable interactivity.

Figure 12:
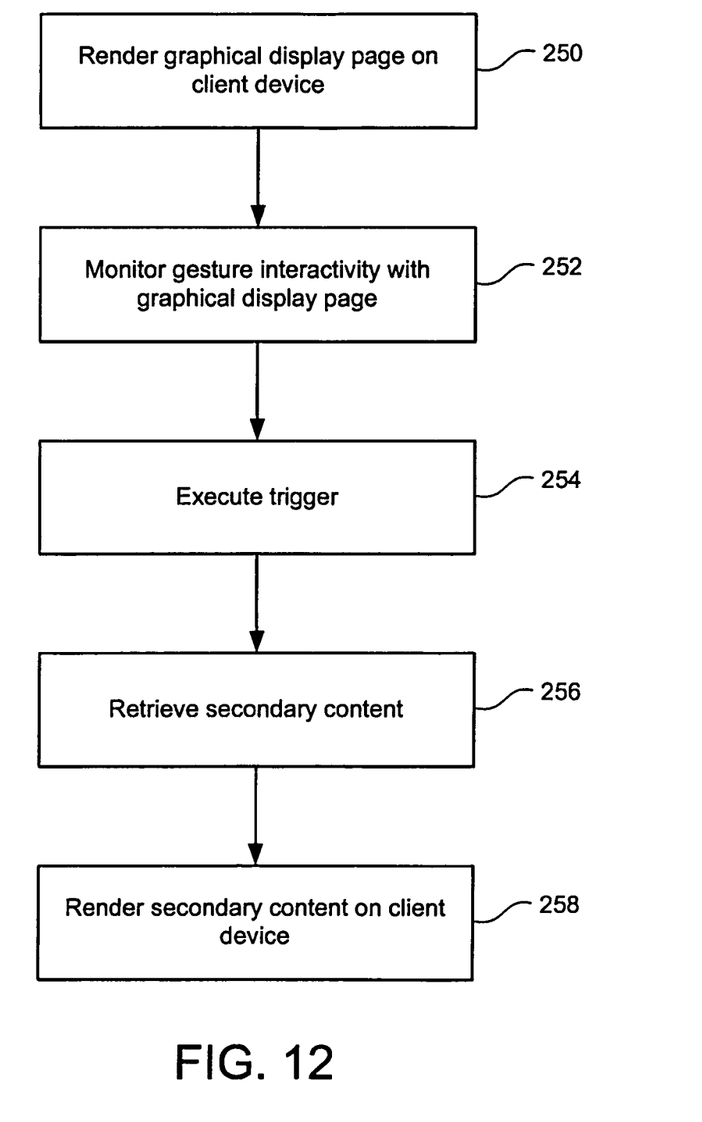
FIG. 12 illustrates a method for presenting content on a client device, in accordance with an embodiment of the invention.

With reference to FIG. 12, a method for presenting content on a client device is shown, in accordance with an embodiment of the invention. At method operation 250, a graphical display page is rendered on a client device. At method operation 252, gesture interactivity with the graphical display page is monitored. At method operation 254, a trigger is executed. In one embodiment, the trigger defines an interactive event, and the trigger is configured to retrieve secondary content when the interactive event occurs, as determined based on the monitored gesture interactivity with the graphical display page. At method operation 256, the secondary content is retrieved when the interactive event occurs, as defined by the trigger. And at method operation 258, the secondary content is rendered on the client device.

Embodiments of the invention as herein described may utilize relational database systems as are known in the art. Examples of such database systems include MySQL, Oracle, and Access. Various operations as described above may be effected by performance of an operation via a relational database management system. Such database systems may be embodied in one or more server computers, which may be configured as part of a network of computers.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for presenting content on a client device, the method comprising,
    rendering a graphical display page on the client device;
    monitoring gesture interactivity with the graphical display page;
    executing a trigger, the trigger defining an interactive event, the trigger configured to retrieve secondary content when the interactive event occurs, as determined based on the monitored gesture interactivity with the graphical display page;
    wherein the trigger is defined by a number of scrolls of the graphical display page;
    retrieving the secondary content when the interactive event occurs, as defined by the trigger;
    rendering the secondary content on the client device.

2. The method of claim 1, wherein the monitoring occurs at the client device.

3. The method of claim 1, wherein the execution of the trigger occurs at the client device.

4. The method of claim 1, wherein the secondary content is rendered along with rendering content of the graphical display page.

5. The method of claim 1,
wherein monitoring interactivity with the graphical display page includes detecting gestures on a touchscreen of the client device; and
wherein gestures include one or more of touching a finger on the touchscreen, sliding a finger on the touchscreen, sliding two or more fingers on the touchscreen, tapping a finger on the touchscreen, moving a finger over a defined pattern or path on the touchscreen, tracing a symbol on the touchscreen.

6. The method of claim 1, wherein the trigger is defined by navigation to a specific location within the graphical display page.

7. The method of claim 1, wherein the secondary content is selected from the group consisting of advertisements, property drivers, and a search tool.

8. The method of claim 7, wherein the property drivers include one or more of a link to a related graphical display page, a link to add an application to the client device, a link to a survey.

9. The method of claim 1, wherein the rendered secondary content is in addition to content of the graphical display page or replaces the content of the graphical display page.

10. The method of claim 1, wherein the secondary content is positioned over at least part of the content of the graphical display page for at least a period of time, or is movable over or next to the content of the graphical display page.

11. A method for presenting content on a client device, the method comprising:
sending a graphical display page to the client device, the graphical display page being rendered on the client device;
sending a trigger to the client device, the trigger defining an interactive event, the trigger, when executed by the client device, being operable for requesting secondary content when the interactive event occurs, as determined based on monitored gesture interactivity with the graphical display page;
wherein the trigger is defined by a timer;
receiving a request for secondary content from the client device when the interactive event occurs, as defined by the trigger;
in response to the request for secondary content, sending the secondary content to the client device, the secondary content being rendered on the client device.

12. The method of claim 11, wherein the secondary content is rendered along with rendering of the graphical display page.

13. The method of claim 11,
wherein the monitored gesture interactivity with the graphical display page includes detected gestures on a touchscreen of the client device; and
wherein the detected gestures include one or more of touching a finger on the touchscreen, sliding a finger on the touchscreen, sliding two or more fingers on the touchscreen, tapping a finger on the touchscreen, moving a finger over a defined pattern or path on the touchscreen, tracing a symbol on the touchscreen.

14. The method of claim 11, wherein the trigger is defined by navigation to a specific location within the graphical display page.

15. The method of claim 11, wherein the secondary content is selected from the group consisting of advertisements, property drivers, and a search tool.

16. The method of claim 15, wherein the property drivers include one or more of a link to a related graphical display page, a link to add an application to the interactive device, a link to a survey.

17. A system for presenting content on a client device, the system comprising:
a page server;
a content server;
a client device,
the client device retrieving a graphical display page from the page server and rendering the graphical display page,
the client device retrieving a trigger from the content server, the trigger defining an interactive event, the trigger, when executed, being operable for retrieving secondary content from the content server when the interactive event occurs, as determined based on monitored gesture interactivity with the graphical display page,
wherein the trigger is defined by a duration of inactivity,
the client device rendering the secondary content.

18. The system of claim 17, wherein monitoring of the gesture interactivity occurs at the client device.

19. The system of claim 17, wherein the execution of the trigger occurs at the client device.

20. The system of claim 17, wherein the secondary content is rendered along with rendering of the graphical display page.

21. The system of claim 17,
wherein the monitored interactivity with the graphical display page includes detected gestures on a touchscreen of the client device; and
wherein the detected gestures include one or more of touching a finger on the touchscreen, sliding a finger on the touchscreen, sliding two or more fingers on the touchscreen, tapping a finger on the touchscreen, moving a finger over a defined pattern or path on the touchscreen, tracing a symbol on the touchscreen.

22. The system of claim 17, wherein the trigger is defined by navigation to a specific location within the graphical display page.

23. The system of claim 17, wherein the secondary content is selected from the group consisting of advertisements, property drivers, and a search tool.

24. The system of claim 23, wherein the property drivers include one or more of a link to a related graphical display page, a link to add an application to the interactive device, a link to a survey.

* * * * *